United States Patent
Stanga et al.

(10) Patent No.: US 10,079,388 B2
(45) Date of Patent: Sep. 18, 2018

(54) AQUEOUS VINYLIDENE FLUORIDE-(METH)ACRYLIC CO-POLYMER LATEX, ELECTRODE AND LITHIUM ION SECONDARY BATTERY USING THE SAME

(75) Inventors: Milena Stanga, Origgio (IT); Riccardo Pieri, Milan (IT); Anna Maria Bertasa, Cesate (IT); Bradley Lane Kent, Woolwich Township, NJ (US); Giulio Brinati, Milan (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 14/232,894

(22) PCT Filed: Jul. 13, 2012

(86) PCT No.: PCT/EP2012/063778
§ 371 (c)(1),
(2), (4) Date: Jan. 14, 2014

(87) PCT Pub. No.: WO2013/010936
PCT Pub. Date: Jan. 24, 2013

(65) Prior Publication Data
US 2014/0154573 A1    Jun. 5, 2014

Related U.S. Application Data
(60) Provisional application No. 61/508,245, filed on Jul. 15, 2011.

(51) Int. Cl.
| | |
|---|---|
| H01M 4/04 | (2006.01) |
| H01M 4/1393 | (2010.01) |
| H01M 4/62 | (2006.01) |
| H01M 10/0525 | (2010.01) |
| C08L 27/16 | (2006.01) |
| C09D 127/16 | (2006.01) |
| H01M 4/133 | (2010.01) |

(52) U.S. Cl.
CPC ............ *H01M 4/623* (2013.01); *C08L 27/16* (2013.01); *C09D 127/16* (2013.01); *H01M 4/0402* (2013.01); *H01M 4/0404* (2013.01); *H01M 4/1393* (2013.01); *H01M 4/622* (2013.01); *H01M 10/0525* (2013.01); *H01M 4/133* (2013.01)

(58) Field of Classification Search
CPC ............ H01M 4/0404; H01M 4/1393; H01M 4/0402; H01M 4/623; H01M 4/622; H01M 10/0525; C09D 127/16; C08L 27/16
USPC .......................... 429/217; 252/182.1; 427/58
See application file for complete search history.

(56) References Cited

U.S. PATENT DOCUMENTS
| | | |
|---|---|---|
| 3,242,218 A | 3/1966 | Miller |
| 3,665,041 A | 5/1972 | Sianesi et al. |
| 3,715,378 A | 2/1973 | Sianesi et al. |
| 4,379,869 A | 4/1983 | Siadat et al. |
| 4,523,039 A | 6/1985 | Lagow et al. |
| 4,990,283 A | 2/1991 | Visca et al. |
| 5,095,081 A | 3/1992 | Bacque et al. |

(Continued)

FOREIGN PATENT DOCUMENTS
| | | |
|---|---|---|
| CA | 786877 A | 6/1968 |
| EP | 148482 B1 | 3/1992 |

(Continued)

OTHER PUBLICATIONS
Mogi et al., Machine translation of JP 2009-267382 A, Nov. 2009.*
International Standard ISO 13321-1996, "Particle size analysis—Photon correlation spectroscopy", 1996, p. 1-20.

*Primary Examiner* — Sean P Cullen

(57) ABSTRACT

The present invention pertains to an aqueous composition comprising: (A) an aqueous latex comprising at least one vinylidene fluoride (VDF) polymer [polymer (F)] comprising recurring units derived from vinylidene fluoride (VDF) and at least one (meth)acrylic monomer (MA) having formula (I) here below: wherein: —$R_1$, $R_2$ and $R_3$, equal to or different from each other, are independently selected from a hydrogen atom and a $C_1$-$C_3$ hydrocarbon group, and —$R_{OH}$ is a hydrogen atom or a $C_1$-$C_5$ hydrocarbon moiety comprising at least one hydroxyl group, (B) at least one powdery electrode material, and (C) optionally, less than 10% by weight, based on the total weight of the aqueous composition, of at least one organic solvent (S), wherein the polymer (F) in the aqueous latex is under the form of primary particles having an average primary particle size of less than 1 μm, as measured according to ISO 13321. The present invention also pertains to a process for manufacturing an electrode using said aqueous composition, to an electrode comprising a metal substrate coated on at least one surface with said aqueous composition and to use of said electrode for manufacturing a non-aqueous-type electrochemical device.

(I)

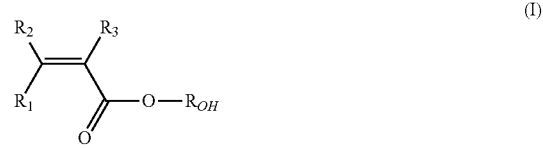

18 Claims, No Drawings

(56) References Cited

U.S. PATENT DOCUMENTS

| | | |
|---|---|---|
| 5,498,680 A | 3/1996 | Abusleme et al. |
| 6,103,843 A | 8/2000 | Abusleme et al. |
| 6,203,944 B1 | 3/2001 | Turner et al. |
| 7,064,170 B2 | 6/2006 | Kaspar et al. |
| 7,122,608 B1 | 10/2006 | Brinati et al. |
| 2002/0168569 A1 | 11/2002 | Barriere et al. |
| 2006/0099505 A1 | 5/2006 | Fujino et al. |
| 2008/0039599 A1 | 2/2008 | Du et al. |
| 2010/0133482 A1* | 6/2010 | Abusleme .............. B01D 69/02 252/511 |
| 2010/0304270 A1 | 12/2010 | Amin-Sanayei et al. |

FOREIGN PATENT DOCUMENTS

| | | |
|---|---|---|
| EP | 1392744 B1 | 7/2008 |
| GB | 1226566 A | 3/1971 |
| GB | 2328786 A | 3/1999 |
| GB | 2430437 A | 3/2007 |
| JP | 10302799 A | 11/1998 |
| JP | 2009246137 A | 10/2009 |
| JP | 2009267382 A | 11/2009 |
| WO | 8700538 A1 | 1/1987 |
| WO | 0003444 A1 | 1/2000 |
| WO | 2008129041 A1 | 10/2008 |
| WO | 2009135030 A1 | 11/2009 |

* cited by examiner

AQUEOUS VINYLIDENE FLUORIDE-(METH)ACRYLIC CO-POLYMER LATEX, ELECTRODE AND LITHIUM ION SECONDARY BATTERY USING THE SAME

This application is a U.S. national stage entry under 35 U.S.C. § 371 of International Application No. PCT/EP2012/063778 filed Jul. 13, 2012, which claims priority to U.S. provisional application No. 61/508,245, filed Jul. 15, 2011. The entire contents of these applications are explicitly incorporated herein by this reference.

TECHNICAL FIELD

The present invention relates to an aqueous composition comprising an aqueous vinylidene fluoride polymer latex and a powdery electrode material, to a process for manufacturing an electrode using said aqueous composition, to an electrode comprising a metal substrate coated on at least one surface with said aqueous composition and to use of said electrode for manufacturing a non-aqueous-type electrochemical device.

BACKGROUND ART

Vinylidene fluoride (VDF) polymers are known in the art to be suitable as binders for the manufacture of electrodes for use in non-aqueous-type electrochemical devices such as batteries, preferably secondary batteries, and electric double layer capacitors.

Generally, techniques for manufacturing electrodes involve the use of organic solvents such as N-methyl-2-pyrrolidone (NMP) for dissolving VDF polymer binders and homogenizing them with a powdery electrode material and all other suitable components to produce a paste to be applied to a metal collector.

The role of the organic solvent is typically to dissolve the VDF polymer in order to bind the powdery electrode material particles to each together and to the metal collector upon evaporation of the organic solvent.

Nevertheless, more recently, approaches are pursued wherein use of organic solvents is commonly avoided so as to ensure more environmentally friendly techniques.

For instance, US 2002/0168569 (ATOFINA) 14, Nov. 2002 discloses a process for manufacturing electrodes and separators for lithium ion batteries, said process comprising processing a microcomposite powder obtained from a fluoropolymer such as notably an acrylic modified fluoropolymer in the form of solid particles having a size between 0.1 μm and 0.5 μm and fillers. The microcomposite powder may be processed without solvents or with solvents by redispersing this powder either in water or in a latent solvent such as acetone or N-methyl-2-pyrrolidone.

Also, US 2006/0099505 11, May 2006 discloses a process for manufacturing an anode for a battery comprising using an anode mixture slurry prepared by dispersing a particulate anode active material and a particulate binder containing at least one of the group consisting of homopolymers and copolymers of vinylidene fluoride (VDF) in a dispersion medium having a swelling degree of 10% or less to the binder. Representative examples of particulate binders typically have an average particle diameter of preferably 30 μm or less and notably include copolymers of VDF with an ethylene unsaturated monomer such as acrylic ester, methacrylic acid ester, vinyl acetate, acrylonitrile, acrylic acid, methacrylic acid, mallein anhydride, butadiene, styrene, N-vinyl pyrrolidone, N-vinyl pyridine, gycidyl methacrylate, hydroxyethyl methacrylate, methyl vinyl ether. The dispersion medium is preferably water, ethanol or methyl isobutyl ketone.

Nevertheless, the processes described in these documents require isolating and drying a vinylidene fluoride (VDF) polymer powder prior to its redispersion in water.

Also, waterborne binder systems have been developed such as those described in US 2010/0304270 (ARKEMA INC.) 2, Dec. 2010, wherein aqueous vinylidene fluoride (VDF) polymer binder latexes as synthesized are used for manufacturing electrodes for non-aqueous-type electrochemical devices.

However, the waterborne vinylidene fluoride (VDF) fluoride polymer binder compositions of the prior art still do not enable obtaining electrodes ensuring good cohesion within the particulate active material and good adhesion between these particles and the metal collector.

To effectively employ waterborne polymer binder compositions in electrode-forming processes, it is important to develop binder systems notably having sufficient stability prior and after admixing with the powdery electrode material, suitable filmability and processing characteristics for being advantageously applied onto the metal collector via standard techniques and for yielding a uniform distribution of the powdery electrode material within the electrode. Most importantly, these binder systems should provide proper cohesion within the powdery electrode material particles and proper adhesion of the powdery electrode material particles to the metal collector after drying.

It is understood that the polymer binder should properly bind the electrode material particles together and to the metal collector so that these particles chemically withstand large volume expansion and contraction during charging and discharging cycles, especially in case of negative electrodes.

A poor cohesion within the powdery electrode material particles and an insufficient adhesion of these particles to the metal collector are typically responsible for high electrical resistance, low capacity and low ion mobility within the electrode.

Further, to be advantageously used in the manufacture of electrodes, in particular for batteries, it is required that the polymer binder is chemically resistant to the electrolyte present in the battery.

There is thus still a need in the art for aqueous vinylidene (VDF) polymer polymer binder compositions which advantageously enable easily manufacturing electrodes for use in non-aqueous-type electrochemical devices, said electrodes having enhanced adhesion and cohesion within the powdery electrode material particles to be endowed with outstanding capacity values.

SUMMARY OF INVENTION

It is thus an object of the present invention an aqueous composition comprising:
(A) an aqueous latex comprising at least one vinylidene fluoride (VDF) polymer [polymer (F)] comprising recurring units derived from vinylidene fluoride (VDF) and at least one (meth)acrylic monomer (MA) having formula (I) here below:

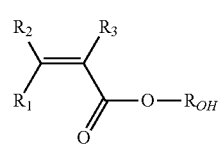

wherein:
R$_1$, R$_2$ and R$_3$, equal to or different from each other, are independently selected from a hydrogen atom and a C$_1$-C$_3$ hydrocarbon group, and
R$_{OH}$ is a hydrogen atom or a C$_1$-C$_5$ hydrocarbon moiety comprising at least one hydroxyl group,
(B) at least one powdery electrode material, and
(C) optionally, less than 10% by weight, based on the total weight of the aqueous composition, of at least one organic solvent (S),
wherein the polymer (F) in the aqueous latex is under the form of primary particles having an average primary particle size of less than 1 μm, as measured according to ISO 13321.

The Applicant has surprisingly found that the aqueous composition of the invention advantageously enables manufacturing electrodes for non-aqueous-type electrochemical devices without the need for isolating a polymer (F) powder from said composition and dispersing it in a suitable solvent.

The Applicant has also found that the aqueous composition of the invention successfully provides for electrodes having enhanced capacity values during charging and discharging cycles.

For the purpose of the present invention, by "aqueous latex" it is intended to denote a latex prepared by an aqueous emulsion polymerization process.

The aqueous latex advantageously has homogeneously dispersed therein primary particles of at least one polymer (F) having an average primary particle size of less than 1 μm, as measured according to ISO 13321.

For the purpose of the present invention, by "average primary particle size" it is intended to denote primary particles of polymer (F) directly obtained by an aqueous emulsion polymerization process. Primary particles of polymer (F) are thus to be intended distinguishable from agglomerates (i.e. collection of primary particles) which might be obtained by recovery and conditioning steps of polymer (F) manufacture like notably concentration and/or coagulation of aqueous polymer (F) latexes and subsequent drying and homogenization.

It has been found that the aqueous latex is successfully stable prior and after admixing with a powder electrode material so as to enable manufacturing electrodes having enhanced capacity values.

For the purpose of the present invention, an aqueous latex is to be intended distinguishable from an aqueous slurry prepared by dispersing a polymer (F) powder in an aqueous medium.

A polymer (F) powder may be obtained either from an aqueous suspension or from an aqueous emulsion polymerization process, provided appropriate work up procedures are used.

Dispersing a polymer (F) powder in an aqueous medium only provides for agglomerates dispersed in water. The average particle size of a polymer (F) powder dispersed in an aqueous slurry is typically higher than 1 μm, as measured according to ISO 13321.

The Applicant thinks, without this limiting the scope of the present invention, that the polymer (F) thanks to the combination of its primary particles in the aqueous latex as obtained by aqueous emulsion polymerization and to the presence of recurring units derived from at least one (meth)acrylic monomer (MA) provides the powdery electrode material particles with enhanced cohesion and ensures they successfully adhere to a metal substrate.

It has been found that an aqueous polymer (F) slurry has no suitable particle size and no sufficient stability prior and after admixing with a powder electrode material to be advantageously used in electrode-forming processes.

The polymer (F) comprises typically at least 50% by moles, preferably at least 70%, more preferably at least 80% by moles of recurring units derived from vinylidene fluoride (VDF).

The polymer (F) comprises typically at least 0.01% by moles, preferably at least 0.02% by moles, more preferably at least 0.03% by moles of recurring units derived from at least one (meth)acrylic monomer (MA) having formula (I) as described above.

The polymer (F) comprises typically at most 10% by moles, preferably at most 5% by moles, more preferably at most 2% by moles of recurring units derived from at least one (meth)acrylic monomer (MA) having formula (I) as described above.

The (meth)acrylic monomer (MA) of the polymer (F) preferably complies with formula (II) here below:

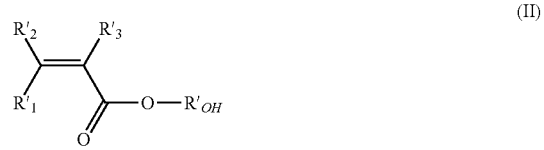

(II)

wherein:
R'$_1$, R'$_2$ and R'$_3$ are hydrogen atoms, and
R'$_{OH}$ is a hydrogen atom or a C$_1$-C$_5$ hydrocarbon moiety comprising at least one hydroxyl group.

Non-limitative examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylate.

The (meth)acrylic monomer (MA) is more preferably selected from the followings:

hydroxyethyl acrylate (HEA) of formula:

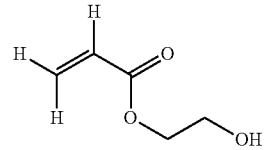

2-hydroxypropyl acrylate (HPA) of either of formulae:

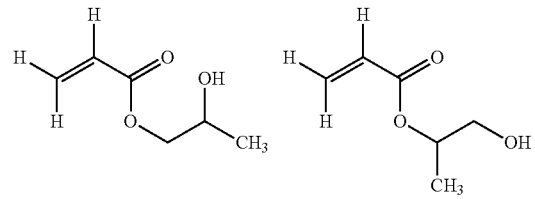

acrylic acid (AA) of formula:

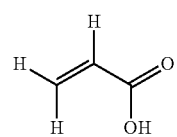

and mixtures thereof.

Good results have been obtained when the (meth)acrylic monomer (MA) of the polymer (F) is acrylic acid (AA) or hydroxyethyl acrylate (HEA).

Very good results have been obtained when the (meth) acrylic monomer (MA) of the polymer (F) is acrylic acid (AA).

The polymer (F) may further comprise recurring units derived from at least one other comonomer (C) as defined above.

The comonomer (C) can be either a hydrogenated comonomer [comonomer (H)] or a fluorinated comonomer [comonomer (F)].

By the term "hydrogenated comonomer [comonomer (H)]", it is hereby intended to denote an ethylenically unsaturated comonomer free of fluorine atoms.

Non-limitative examples of suitable hydrogenated comonomers (H) include, notably, ethylene, propylene, vinyl monomers such as vinyl acetate, as well as styrene monomers, like styrene and p-methylstyrene.

By the term "fluorinated comonomer [comonomer (F)]", it is hereby intended to denote an ethylenically unsaturated comonomer comprising at least one fluorine atom.

The comonomer (C) is preferably a fluorinated comonomer [comonomer (F)].

Non-limitative examples of suitable fluorinated comonomers (F) include, notably, the followings:

(a) $C_2$-$C_8$ fluoro- and/or perfluoroolefins such as tetrafluoroethylene (TFE), hexafluoropropylene (HFP), pentafluoropropylene and hexafluoroisobutylene;

(b) $C_2$-$C_8$ hydrogenated monofluoroolefins such as vinyl fluoride, 1,2-difluoroethylene and trifluoroethylene;

(c) perfluoroalkylethylenes of formula $CH_2=CH-R_{f0}$, wherein $R_{f0}$ is a $C_1$-$C_6$ perfluoroalkyl group;

(d) chloro- and/or bromo- and/or iodo-$C_2$-$C_6$ fluoroolefins such as chlorotrifluoroethylene (CTFE);

(e) (per)fluoroalkylvinylethers of formula $CF_2=CFOR_{f1}$, wherein $R_{f1}$ is a $C_1$-$C_6$ fluoro- or perfluoroalkyl group, e.g. $-CF_3$, $-C_2F_5$, $-C_3F_7$;

(f) (per)fluoro-oxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(g) fluoroalkyl-methoxy-vinylethers of formula $CF_2=CFOCF_2OR_{f2}$, wherein $R_{f2}$ is a $C_1$-$C_6$ fluoro- or perfluoroalkyl group, e.g. $-CF_3$, $-C_2F_5$, $-C_3F_7$ or a $C_1$-$C_6$ (per)fluorooxyalkyl group having one or more ether groups, e.g. $-C_2F_5-O-CF_3$;

(h) fluorodioxoles of formula:

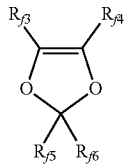

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms, e.g. $-CF_3$, $-C_2F_5$, $-C_3F_7$, $-OCF_3$, $-OCF_2CF_2OCF_3$.

Most preferred fluorinated comonomers (F) are tetrafluoroethylene (TFE), trifluoroethylene (TrFE), chlorotrifluoroethylene (CTFE), hexafluoropropylene (HFP), perfluoromethyl vinyl ether (PMVE), perfluoropropyl vinyl ether (PPVE) and vinyl fluoride.

Should at least one comonomer (C) be present, the polymer (F) comprises typically from 1% to 40% by moles, preferably from 2% to 35% by moles, more preferably from 3% to 20% by moles of recurring units derived from said comonomer(s) (C).

The aqueous composition of the invention is advantageously manufactured by:

providing an aqueous latex comprising at least one polymer (F) as defined above, and admixing said aqueous latex with at least one powdery electrode material as defined above, optionally in the presence of one or more additives.

Non-limitative examples of suitable additives include, notably, electroconductivity-imparting additives and/or thickeners.

An electroconductivity-imparting additive may be added in order to improve the conductivity of the electrode. Non-limitative examples of suitable electroconductivity-imparting additives include, notably, carbon black, graphene or carbon nanotubes and powders and fibers of metals, such as nickel and aluminum.

A thickener may be added in order to prevent or slow down the settling of the powdery electrode material from the aqueous composition of the invention. Non-limitative examples of suitable thickeners include, notably, organic thickeners such as partially neutralized poly(acrylic acid) or poly(methacrylic acid), carboxylated alkyl cellulose like carboxylated methyl cellulose and inorganic thickeners such as natural clays like montmorillonite and bentonite, man-made clays like laponite and others like silica and talc.

The aqueous latex of the aqueous composition of the invention is prepared by aqueous emulsion polymerization in an aqueous medium of vinylidene fluoride (VDF) and at least one (meth)acrylic monomer (MA) having formula (I) as described above, optionally in the presence of at least one other comonomer (C) as defined above.

The aqueous emulsion polymerization process as detailed above is typically carried out in the presence of at least one radical initiator.

Polymerization pressure ranges typically between 20 and 70 bar, preferably between 25 and 65 bar.

The skilled in the art will choose the polymerization temperature having regards, inter alia, of the radical initiator used. Polymerization temperature is generally selected in the range comprised between 60° C. and 135° C., preferably between 90° C. and 130° C.

While the choice of the radical initiator is not particularly limited, it is understood that radical initiators suitable for an aqueous emulsion polymerization process are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butylper-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable radical initiators notably include halogenated free radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)-[CF(CF_3) \quad CF_2O]_m-CF(CF_3)-COO\}_2$ where m=0-8, $[ClCF_2(CF_2)_nCOO]_2$, and $[HCF_2(CF_2)_n COO]_2$ where n=0-8; perfluoroalkyl azo compounds such as perfluoroazoisopropane, $[(CF_3)_2CFN=]_2$, $RR^nN=NRR^n$, where $RR^n$ is a linear or branched perfluorocarbon group having 1-8 carbons; stable or hindered perfluoroalkane radicals such as hexafluoropropylene trimer radical, $[(CF_3)_2 CF]_2(CF_2CF_2)C^{\bullet}$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as radical initiators to initiate the polymerization process.

Most preferred radical initiators which may be advantageously used in the aqueous emulsion polymerization as detailed above are inorganic radical initiators as defined above, organic radical initiators as defined above and mixtures thereof.

Among inorganic radical initiators, ammonium persulfate is particularly preferred.

Among organic radical initiators, the peroxides having a self-accelerating decomposition temperature (SADT) higher than 50° C. are particularly preferred, such as for instance: di-tert-butyl peroxide (DTBP), diterbutylperoxyisopropylcarbonate, terbutyl(2-ethyl-hexyl)peroxycarbonate, terbutylperoxy-3,5,5-trimethylhexanoate.

One or more radical initiators as defined above may be added to the aqueous medium as defined above in an amount ranging advantageously from 0.001% to 20% by weight based on the weight of the aqueous medium.

The aqueous emulsion polymerization process as detailed above is typically carried out in the presence of a chain transfer agent. The chain transfer agent is generally selected from those known in the polymerization of fluorinated monomers such as ketones, esters, ethers or aliphatic alcohols having from 3 to 10 carbon atoms like, e.g., acetone, ethylacetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl) carbonate, bis(isobutyl)carbonate. The chain transfer agent may be fed to the aqueous medium at the beginning, continuously or in discrete amounts (step-wise) during the polymerization, continuous or stepwise feeding being preferred.

The aqueous emulsion polymerization process as detailed above may be carried out in the presence of at least one non-functional perfluoropolyether (PFPE) oil and/or at least one fluorinated surfactant [surfactant (FS)].

By "non-functional perfluoropolyether (PFPE) oil" it is hereby intended to denote a perfluoropolyether (PFPE) oil comprising a (per)fluoropolyoxyalkylene chain [chain ($R_f$)] and non-functional end-groups.

The non-functional end groups of the perfluoropolyether (PFPE) oil are generally selected from fluoro(halo)alkyls having 1 to 3 carbon atoms, optionally comprising one or more halogen atoms different from fluorine or hydrogen atoms, e.g. $CF_3-$, $C_2F_5-$, $C_3F_6-$, $ClCF_2CF(CF_3)-$, $CF_3CFClCF_2-$, $ClCF_2CF_2-$, $ClCF_2-$.

The non-functional PFPE oil has a number average molecular weight advantageously comprised between 400 and 3000, preferably between 600 and 1500.

The non-functional PFPE oil is preferably selected from the followings:

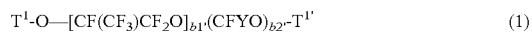
$$T^1-O-[CF(CF_3)CF_2O]_{b1'}(CFYO)_{b2'}-T^{1'} \qquad (1)$$

wherein:
$T^1$ and $T^{1'}$, equal to or different from each other, are independently selected from $-CF_3$, $-C_2F_5$ and $-C_3F_7$ groups;
Y, equal or different at each occurrence, is selected from a fluorine atom and a $-CF_3$ group;
b1' and b2', equal to or different from each other, are independently integers ≥0 such that the b1'/b2' ratio is comprised between 20 and 1000 and the (b1'+b2') sum is comprised between 5 and 250; should b1' and b2' be both different from zero, the different recurring units are generally statistically distributed along the perfluoropolyoxyalkylene chain. Said products can be obtained by photooxidation of $C_3F_6$ as described in CA 786877 (MONTEDISON S.P.A.) Apr. 6, 1968 and by subsequent conversion of the end groups as described in GB 1226566 (MONTECATINI EDISON S.P.A.) 31, Mar. 1971.

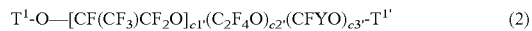
$$T^1-O-[CF(CF_3)CF_2O]_{c1'}(C_2F_4O)_{c2'}(CFYO)_{c3'}-T^{1'} \qquad (2)$$

wherein:
$T^1$ and $T^{1'}$, equal to or different from each other, have the same meaning as defined above;
Y, equal or different at each occurrence, has the same meaning as defined above;
c1', c2' and c3', equal to or different from each other, are independently integers ≥0 such that the (c1'+c2'+c3') sum is comprised between 5 and 250; should at least two of c1', c2' and c3' be different from zero, the different recurring units are generally statistically distributed along the perfluoropolyoxyalkylene chain.

Said products can be manufactured by photooxidation of a mixture of $C_3F_6$ and $C_2F_4$ and subsequent treatment with fluorine as described in U.S. Pat. No. 3,665,041 (MONTECATINI EDISON S.P.A.) 23, May 1972.

$$T^1-O-(C_2F_4O)_{d1'}(CF_2O)_{d2'}-T^{1'} \qquad (3)$$

wherein:
$T^1$ and $T^{1'}$, equal to or different from each other, have the same meaning as defined above;
d1' and d2', equal to or different from each other, are independently integers ≥0 such that the d1'/d2' ratio is comprised between 0.1 and 5 and the (d1'+d2') sum is comprised between 5 and 250; should d1' and d2' be both different from zero, the different recurring units are generally statistically distributed along the perfluoropolyoxyalkylene chain. Said products can be produced by photooxidation of $C_2F_4$ as reported in U.S. Pat. No. 3,715,378 (MONTECATINI EDISON S.P.A.) 6, Feb. 1973 and subsequent treatment with fluorine as described in U.S. Pat. No. 3,665,041 (MONTECATINI EDISON S.P.A.) 23, May 1972.

$$T^2\text{-}O\text{—}[CF(CF_3)CF_2O]_{e'}\text{-}T^{2'} \tag{4}$$

wherein:
$T^2$ and $T^{2'}$, equal to or different from each other, are independently selected from —$C_2F_5$ and —$C_3F_7$ groups;
e' is an integer comprised between 5 and 250.

Said products can be prepared by ionic hexafluoropropylene epoxide oligomerization and subsequent treatment with fluorine as described in U.S. Pat. No. 3,242,218 (E. I. DU PONT DE NEMOURS AND CO.) 22, Mar. 1966.

$$T^2\text{-}O\text{—}(CF_2CF_2O)_{f'}\text{-}T^{2'} \tag{5}$$

wherein:
$T^2$ and $T^{2'}$, equal to or different from each other, have the same meaning as defined above;
f' is an integer comprised between 5 and 250.

Said products can be obtained by a method comprising fluorinating a polyethyleneoxide, e.g. with elemental fluorine, and optionally thermally fragmentating the so-obtained fluorinated polyethyleneoxide as reported in U.S. Pat. No. 4,523,039 (THE UNIVERSITY OF TEXAS) 11, Jun. 1985.

$$T^1\text{-}O\text{—}(CF_2CF_2C(Hal')_2O)_{g1'}\text{—}(CF_2CF_2CH_2O)_{g2'}\text{—}(CF_2CF_2CH(Hal')O)_{g3'}\text{-}T^{1'} \tag{6}$$

wherein:
$T^1$ and $T^{1'}$, equal to or different from each other, have the same meaning as defined above;
Hal', equal or different at each occurrence, is a halogen selected from fluorine and chlorine atoms, preferably a fluorine atom;
g1', g2', and g3', equal to or different from each other, are independently integers ≥0 such that the (g1'+g2'+g3') sum is comprised between 5 and 250; should at least two of g1', g2' and g3' be different from zero, the different recurring units are generally statistically distributed along the (per)fluoropolyoxyalkylene chain.

Said products may be prepared by ring-opening polymerizing 2,2,3,3-tetrafluorooxethane in the presence of a polymerization initiator to give a polyether comprising repeating units of the formula: —$CH_2CF_2CF_2O$—, and optionally fluorinating and/or chlorinating said polyether, as detailed in EP 148482 B (DAIKIN INDUSTRIES LTD.) 25, Mar. 1992.

$$R^1_f\text{—}\{C(CF_3)_2\text{—}O\text{—}[C(R^2_f)_2]_{j1'}C(R^2_f)_2\text{—}O\}_{j2'}\text{—}R^1_f \tag{7}$$

wherein:
$R^1_f$, equal or different at each occurrence, is a $C_1$-$C_6$ perfluoroalkyl group;
$R^2_f$, equal or different at each occurrence, is selected from a fluorine atom and a $C_1$-$C_6$ perfluoroalkyl group;
j1' is equal to 1 or 2;
j2' is an integer comprised between 5 and 250.

Said products can be produced by the copolymerization of hexafluoroacetone with an oxygen-containing cyclic comonomer selected from ethylene oxide, propylene oxide, epoxy-butane and/or trimethylene oxide (oxethane) or substituted derivatives thereof and subsequent perfluorination of the resulting copolymer, as detailed in patent application WO 87/00538 (LAGOW ET AL.) 29, Jan. 1987.

The non-functional PFPE oil is more preferably selected from the followings:
(1') non-functional PFPE oils commercially available from Solvay Solexis S.p.A. under the trademark names GALDEN® and FOMBLIN®, said PFPE oils generally comprising at least one PFPE oil complying with either of formulae here below:

$$CF_3\text{—}[(OCF_2CF_2)_m\text{—}(OCF_2)_n]\text{—}OCF_3$$

m+n=40-180; m/n=0.5-2

$$CF_3\text{—}[(OCF(CF_3)CF_2)_p\text{—}(OCF_2)_q]\text{—}OCF_3$$

p+q=8-45; p/q=20-1000
(2') non-functional PFPE oils commercially available from Daikin under the trademark name DEMNUM®, said PFPEs generally comprising at least one PFPE complying with formula here below:

$$F\text{—}(CF_2CF_2CF_2O)_n\text{—}(CF_2CF_2CH_2O)_j\text{—}CF_2CF_3$$

j=0 or integer >0; n+j=10-150
(3') non-functional PFPE oils commercially available from Du Pont de Nemours under the trademark name KRYTOX®, said PFPEs generally comprising at least one low-molecular weight, fluorine end-capped, homopolymer of hexafluoropropylene epoxide complying with formula here below:

$$F\text{—}(CF(CF_3)CF_2O)_n\text{—}CF_2CF_3$$

n=10-60

The non-functional PFPE oil is even more preferably selected from those having formula (1') as described above.

The fluorinated surfactant (FS) typically complies with formula (III) here below:

$$R_{fs}(X^-)_k(M^+)_k \tag{III}$$

wherein:
$R_{fs}$ is selected from a $C_5$-$C_{16}$ (per)fluoroalkyl chain, optionally comprising one or more catenary or non-catenary oxygen atoms, and a (per)fluoropolyoxyalkyl chain,
$X^-$ is selected from —$COO^-$, —$PO_3^-$ and —$SO_3^-$,
$M^+$ is selected from $NH_4^+$ and an alkaline metal ion, and
k is 1 or 2.

Non-limitative examples of fluorinated surfactants (FS) suitable for the aqueous emulsion polymerization process of the invention include, notably, the followings:
(a) $CF_3(CF_2)_{n0}COOM'$, wherein $n_0$ is an integer ranging from 4 to 10, preferably from 5 to 7, preferably $n_1$ being equal to 6, and M' represents $NH_4$, Na, Li or K, preferably $NH_4$;
(b) T-$(C_3F_6O)_{n1}(CFXO)_{m1}CF_2COOM''$, wherein T represents a Cl atom or a perfluoroalkoxyde group of formula $C_xF_{2x+1-x'}Cl_{x'}O$, wherein x is an integer ranging from 1 to 3 and x' is 0 or 1, $n_1$ is an integer ranging from 1 to 6, $m_1$ is an integer ranging from 0 to 6, M'' represents $NH_4$, Na, Li or K and X represents F or —$CF_3$;
(c) F—$(CF_2CF_2)_{n2}$—$CH_2$—$CH_2$—$RO_3M'''$, in which R is a phosphorus or a sulphur atom, preferably R being a sulphur atom, M''' represents $NH_4$, Na, Li or K and $n_2$ is an integer ranging from 2 to 5, preferably $n_2$ being equal to 3;
(d) A-$R_{bf}$—B bifunctional fluorinated surfactants, wherein A and B, equal to or different from each other, have formula —$(O)_pCFX''$—$COOM^*$, wherein $M^*$ represents $NH_4$, Na, Li or K, preferably $M^*$ representing $NH_4$, X'' is F or —$CF_3$ and p is an integer equal to 0 or 1, and $R_{bf}$ is a divalent (per)fluoroalkyl or (per)fluoropolyether chain such that the number average molecular weight of A-$R_{bf}$—B is in the range of from 300 to 1800; and
(e) mixtures thereof.

Preferred fluorinated surfactants (FS) comply with formula (b) as described above.

Aqueous emulsion polymerization processes as detailed above have been described in the art (see e.g. U.S. Pat. No. 4,990,283 (AUSIMONT S.P.A.) 5, Feb. 1991, U.S. Pat. No. 5,498,680 (AUSIMONT S.P.A.) 12, Mar. 1996 and U.S. Pat. No. 6,103,843 (AUSIMONT S.P.A.) 15, Aug. 2000.

The aqueous emulsion polymerization process as detailed above results in an aqueous latex comprising at least one polymer (F) as defined above.

The aqueous latex may further comprise at least one fluorinated surfactant [surfactant (FS)] as defined above.

One or more hydrogenated surfactants [surfactant (H)] may optionally be further added to the aqueous latex.

Non-limitative examples of suitable hydrogenated surfactants (H) include, notably, ionic and non-ionic hydrogenated surfactants such as 3-allyloxy-2-hydroxy-1-propane sulfonic acid salts, polyvinylphosphonic acid, polyacrylic acids, polyvinyl sulfonic acid, and salts thereof, octylphenol ethoxylates, polyethylene glycol and/or polypropylene glycol and the block copolymers thereof, alkyl phosphonates and siloxane-based surfactants.

Hydrogenated surfactants (H) which may be preferably added to the aqueous latex are non-ionic surfactants commercially available as TRITON® X series and PLURONIC® series.

The aqueous composition of the invention preferably comprises:
(A) an aqueous latex comprising:
   from 10% to 50% by weight, preferably from 20% to 35% by weight, based on the total weight of the aqueous latex, of at least one polymer (F) as defined above, and optionally, at least one surfactant selected from a fluorinated surfactant (FS) as defined above, a hydrogenated surfactant (H) as defined above and mixtures thereof,
(B) from 20% to 80% by weight, preferably from 40% to 70% by weight, based on the total weight of the aqueous composition, of at least one powdery electrode material, and
(C) optionally, less than 10% by weight, preferably less than 5% by weight, based on the total weight of the aqueous composition, of an organic solvent (S),
wherein the polymer (F) in the aqueous latex is under the form of primary particles having an average primary particle size comprised between 50 nm and 600 nm, preferably between 60 nm and 500 nm, more preferably between 80 nm and 400 nm, as measured according to ISO 13321.

Non-limitative examples of suitable organic solvents (S) include, notably, those capable of dissolving the polymer (F) as defined above.

Most preferred organic solvents (S) include, notably, the followings: N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, trimethyl phosphate and mixtures thereof.

The aqueous composition of the invention more preferably consists of:
(A) an aqueous latex consisting of:
   from 10% to 50% by weight, preferably from 20% to 35% by weight, based on the total weight of the aqueous latex, of at least one polymer (F) as defined above, and optionally, at least one surfactant selected from a fluorinated surfactant (FS) as defined above, a hydrogenated surfactant (H) as defined above and mixtures thereof, and
(B) from 20% to 80% by weight, preferably from 40% to 70% by weight, based on the total weight of the aqueous composition, of at least one powdery electrode material,
wherein the polymer (F) in the aqueous latex is under the form of primary particles having an average primary particle size comprised between 50 nm and 600 nm, preferably between 60 nm and 500 nm, more preferably between 80 nm and 400 nm, as measured according to ISO 13321.

According to a preferred embodiment of the aqueous composition of the invention, the aqueous latex is prepared by an aqueous emulsion polymerization process as detailed above without any subsequent coagulation step.

The Applicant thinks, without this limiting the scope of the present invention, that by coagulation of aqueous polymer (F) latexes as obtained by an aqueous emulsion polymerization process as detailed above, agglomerates (i.e. collection of primary particles) of polymer (F) particles are irreversibly obtained, so that the advantageous properties exhibited by the aqueous polymer (F) latexes as directly obtained by an aqueous emulsion polymerization process as detailed above in electrode-forming processes are lost.

For the purpose of the present invention, by "powdery electrode material" it is intended to denote an electroactive particulate material which is suitable for the manufacture of an electrode.

The nature of the powdery electrode material will depend on whether the aqueous composition of the invention will be used to form a positive or a negative electrode.

In the case of forming a positive electrode for a lithium ion battery, the powdery electrode material may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

As an alternative, still in the case of forming a positive electrode for a lithium ion battery, the powdery electrode material may comprise a lithiated or partially lithiated transition metal oxyanion-based electrode materials of the nominal formula $AB(XO_4)_fE_{1-f}$, in which A is lithium, which may be partially substituted by another alkali metal representing less than 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1.

The above $AB(XO_4)_fE_{1-f}$ electrode materials are preferably phosphate-based and may have an ordered or modified olivine structure.

More preferably, the powdery electrode material as described above complies with formula $Li_{3-x}M'_yM''_{2-y}(XO_4)_3$ in which: $0 \leq x \leq 3$, $0 \leq y \leq 2$; M' and M'' are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the active material is a phosphate-based electrode material having the nominal formula $Li(Fe_xMn_{1-x})PO_4$ in which $0 \leq x \leq 1$, wherein x is preferably 1 (that is to say, Lithium Iron Phosphate of formula: $LiFePO_4$).

The aqueous composition of the invention is preferably used to form a negative electrode or anode.

In the case of forming a negative electrode for a lithium ion battery, the powdery electrode material may preferably comprise:
- graphitic carbons able to intercalate lithium, typically existing in forms such as powders, flakes, fibers or spheres (for example, mesocarbon microbeads) hosting lithium;
- lithium metal;
- lithium alloy compositions, including notably those described in U.S. Pat. No. 6,203,944 (3M INNOVATIVE PROPERTIES CO.) 20, Mar. 2001 and/or in WO 00/03444 (MINNESOTA MINING AND MANUFACTURING CO.) 10, Jun. 2005;
- lithium titanates, generally represented by formula $Li_4Ti_5O_{12}$; these compounds are generally considered as "zero-strain" insertion materials, having low level of physical expansion upon taking up the mobile ions, i.e. $Li^+$;
- lithium-silicon alloys, generally known as lithium silicides with high Li/Si ratios, in particular lithium silicides of formula $Li_{4.4}Si^-$;
- lithium-germanium alloys, including crystalline phases of formula $Li_{4.4}Ge$.

The powdery electrode material for an electric double layer capacitor may preferably comprise particles or fibers, such as activated carbon, activated carbon fibers, silica or alumina particles, having an average particle (or fiber) size of from 0.05 μm to 100 μm and a specific surface area of from 100 m²/g to 3000 m²/g, i.e., having a relatively small particle (or fiber) size and a relatively large specific surface area compared with those of electrode materials for batteries.

Another object of the present invention is a process for manufacturing an electrode, said process comprising the following steps:
(i) providing an aqueous latex comprising at least one vinylidene fluoride (VDF) polymer [polymer (F)], said polymer (F) comprising recurring units derived from vinylidene fluoride (VDF) and at least one (meth)acrylic monomer (MA) having formula (I) here below:

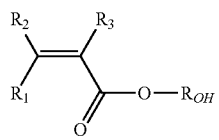

(I)

wherein:
- $R_1$, $R_2$ and $R_3$, equal to or different from each other, are independently selected from a hydrogen atom and a $C_1$-$C_3$ hydrocarbon group, and
- $R_{OH}$ is a hydrogen atom or a $C_1$-$C_5$ hydrocarbon moiety comprising at least one hydroxyl group;

(ii) admixing said aqueous latex with at least one powdery electrode material, optionally in the presence of one or more additives, to provide an aqueous electrode-forming composition;
(iii) applying said aqueous electrode-forming composition onto at least one surface of a metal substrate to provide at least one electroactive layer adhered to at least one surface of said metal substrate; and
(iv) drying said electroactive layer to provide said electrode.

The aqueous latex and the powdery electrode material of the process of the invention are defined as above.

The Applicant has found that by the process of the present invention it is advantageously possible to easily manufacture electrodes suitable for use in non-aqueous electrochemical devices directly by means of an aqueous polymer (F) latex as obtained by an aqueous emulsion polymerization process, said electrodes having enhanced capacity values during charging and discharging cycles.

The Applicant thinks, without this limiting the scope of the present invention, that the polymer (F) thanks to the combination of its primary particles in the aqueous latex as obtained by aqueous emulsion polymerization and to the presence of recurring units derived from at least one (meth) acrylic monomer (MA) provides the electroactive layer obtained by the process of the invention with improved cohesion and ensures that it successfully adheres to the metal substrate.

Non-limitative examples of non-aqueous-type electrochemical devices include, notably, batteries, preferably secondary batteries, and electric double layer capacitors.

For the purpose of the present invention, by "secondary battery" it is intended to denote a rechargeable battery. Non-limitative examples of secondary batteries which may be advantageously obtained by the process of the invention include, notably, alkaline or alkaline-earth secondary batteries.

The process of the invention is particularly adapted for the manufacture of electrodes suitable for use in lithium ion secondary batteries, preferably for the manufacture of negative electrodes or anodes for use in lithium ion secondary batteries.

In step (ii) of the process of the invention, the aqueous electrode-forming composition is prepared generally by dispersing at least one powdery electrode material into the aqueous latex provided by step (i) of the process of the invention.

The aqueous electrode-forming composition so obtained is then commonly subjected to a shear mixing to ensure uniform distribution of the powdery electrode material in the composition.

The aqueous electrode-forming composition provided by step (ii) of the process of the invention is advantageously the aqueous composition of the invention.

The skilled in the art will properly adapt the viscosity of the aqueous electrode-forming composition so as to enable obtaining by the process of the invention a uniform distribution of the powdery electrode material within the electrode.

The aqueous electrode-forming composition provided by step (ii) of the process of the invention typically comprises from 20% to 80% by weight, preferably from 40% to 70% by weight, based on the total weight of the aqueous electrode-forming composition, of at least one powdery electrode material as defined above.

The aqueous electrode-forming composition provided by step (ii) of the process of the invention may further comprise one or more additives.

Non-limitative examples of suitable additives include, notably, electroconductivity-imparting additives and/or thickeners as defined above.

Preferred aqueous electrode-forming compositions for manufacturing negative electrodes or anodes comprise:
(a') from 0.5% to 10% by weight, preferably from 1% to 8% by weight, based on the total weight of (a')+(b')+(c'), of at least one polymer (F) as defined above, (b') from 20% to 80% by weight, preferably from 40% to 70% by weight, based on the total weight of (a')+(b')+(c'), of at least one powdery electrode material as defined above, and, (c') optionally, up to 2% by weight, preferably up to 1.5% by weight, based on the total weight of (a')+(b')+(c'), of a thickener as defined above.

In step (iii) of the process of the invention, the aqueous electrode-forming composition provided by step (ii) of the process of the invention is applied onto at least one surface of a metal substrate by techniques commonly known in the art such as by casting, brush, roller, ink jet, squeegee, foam applicator, curtain coating, vacuum coating, spraying.

For the purpose of the present invention, by "electroactive layer" it is intended to denote a layer made of the aqueous electrode-forming composition provided by step (ii) of the process of the invention.

In step (iv) of the process of the invention, the electroactive layer adhered to at least one surface of a metal substrate is dried typically at temperatures of at least 50° C., preferably of at least 60° C. and of at most 210° C., preferably of at most 200° C.

The metal substrate is generally a foil, mesh or net made of a metal such as copper, aluminum, iron, stainless steel, nickel, titanium or silver.

Still, another object of the present invention is an electrode comprising a metal substrate coated on at least one surface with the aqueous composition of the invention.

The metal substrate of the electrode of the invention is defined as above.

The aqueous composition of the electrode of the invention may be advantageously the aqueous electrode-forming composition provided by step (ii) of the process of the invention.

The electrode of the present invention is particularly suitable for use in non-aqueous-type electrochemical devices such as batteries, preferably secondary batteries, and electric double layer capacitors.

The electrode of the present invention is advantageously manufactured by the process of the present invention.

The electrode of the invention preferably comprises:
  from 1% to 15% by weight, preferably from 2% to 12% by weight, based on the total weight of the electrode, of at least one polymer (F) as defined above,
  from 80% to 99% by weight, preferably from 85% to 98% by weight, based on the total weight of the electrode, of at least one powdery electrode material as defined above, and
  optionally, up to 10% by weight, preferably up to 5% by weight, based on the total weight of the electrode, of one or more additives as defined above.

The electrode of the invention may be a positive or a negative electrode.

The electrode of the invention is preferably a negative electrode or anode.

Also, another object of the present invention is use of the electrode of the invention for manufacturing non-aqueous-type electrochemical devices.

The electrode of the invention is preferably used for manufacturing secondary batteries such as alkaline or alkaline-earth secondary batteries.

The electrode of the invention is more preferably used for manufacturing lithium ion secondary batteries.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

FLUOROLINK® 7800 SW is a functional PFPE having formula $Cl(C_3F_6O)_nCF_2COOH$.

Determination of Total Average Monomer (MA) Content

Total average monomer (MA) content in vinylidene fluoride (VDF) polymers was determined by acid-base titration.

A sample of 1.0 g of polymer was dissolved in acetone at a temperature of 70° C. Water (5 ml) was then added dropwise under vigorous stirring so as to avoid coagulation of the polymer. Titration with aqueous NaOH having a concentration of 0.01 N until complete neutralization of acidity was then carried out, with neutrality transition at about −170 mV.

Determination of Viscosity

The viscosity of the aqueous composition was measured using a Brookfield viscosimeter DV-II, spindle n° 6 at 10 rpm and 25° C.

EXAMPLE 1—AQUEOUS VDF-AA POLYMER LATEX (A) Manufacture of Aqueous VDF-AA Polymer Latex In a 21 lt. horizontal reactor autoclave equipped with baffles and stirrer working at 40 rpm, 14 lt. of deionised water were introduced, followed by 0.1 g of a 20% by weight aqueous solution of FLUOROLINK® 7800 SW sodium salt fluorinated surfactant. The pressure of 35 bar was maintained constant throughout the whole trial by feeding VDF gaseous monomer. Then the temperature was brought to 85° C. and 400 ml of a 37.5 g/l aqueous solution of ammonium persulfate (APS) were added over a period of 20 minutes. For the whole duration of the trial, 20 ml of a solution of acrylic acid (AA) (2.3% w/w acrylic acid in water) were fed every 250 g of polymer synthesized.

When 5000 g of the mixture were fed, the feeding mixture was interrupted, then the pressure was let to fall down up to 11 bar while keeping the reaction temperature constant. Final reaction time was 150 min.

The reactor was cooled to room temperature, the latex was unloaded and 1000 g of a 10% by weight aqueous solution of PLURONIC® F108 hydrogenated surfactant were added upon stirring.

The VDF-AA polymer so obtained contained 0.15% by moles of acrylic acid (AA) monomer.

The aqueous latex so obtained had a solid content of 26% by weight.

The VDF-AA polymer is dispersed in the aqueous latex under the form of particles having an average primary size of 340 nm, as measured according to ISO 13321.

(B) Manufacture of a Negative Electrode

An aqueous composition was prepared by mixing 3.46 g of VDF-AA polymer latex and 0.3 g of carboxylated methyl cellulose as thickener, 12.3 g of deionised water and 28.8 g of synthetic graphitized mesocarbon microbeads commercially available as MCMB 6-28 by OSAKA GAS CHEMICAL Co., Ltd. The mixture was homogenised by moderate stirring using a Dispermat equipped with a flat PTFE disc.

A negative electrode was obtained casting the aqueous composition so obtained on a copper foil with a doctor blade and drying the coating layer so obtained in an oven with three temperature steps held at 60° C., 100° C. and 200° C., each for about 30 minutes.

The thickness of the dried coating layer was about 50-60 μm.

The negative electrode so obtained was composed by 3% by weight of the VDF-AA polymer binder, 96% by weight of the active material and 1% by weight of the thickener.

(C) Manufacture of a Positive Electrode

An aqueous composition was prepared by mixing 6.43 g of VDF-AA polymer latex and 0.3 g of carboxylated methyl cellulose as thickener, 15.66 g of deionised water, 1.56 g of SUPER® P conductive carbon black and 27.8 g of $LiCoO_2$. The mixture was homogenised by moderate stirring using a Dispermat equipped with a flat PTFE disc.

A positive electrode was obtained casting the aqueous composition so obtained on an aluminum foil with a doctor blade and drying the coating layer so obtained in an oven with three temperature steps held at 60° C., 100° C. and 200° C., each for about 30 minutes.

The thickness of the dried coating layer was about 50-60 μm.

The positive electrode so obtained was composed by 5% by weight of the VDF-AA polymer binder, 89% by weight of the active material, 5% by weight of the carbon black and 1% by weight of the thickener.

(D) Manufacture of a Positive Electrode

An aqueous composition was prepared by mixing 9.69 g of VDF-AA polymer latex and 0.3 g of carboxylated methyl cellulose as thickener, 34.71 g of deionised water, 2.8 g of SUPER® P conductive carbon black and 22.76 g of $LiFePO_4$. The mixture was homogenised by moderate stirring using a Dispermat equipped with a flat PTFE disc.

A positive electrode was obtained casting the aqueous composition so obtained on an aluminum foil with a doctor blade and drying the coating layer so obtained in an oven with three temperature steps held at 60° C., 100° C. and 200° C., each for about 30 minutes.

The thickness of the dried coating layer was about 50-60 μm.

The positive electrode so obtained was composed by 8% by weight of the VDF-AA polymer binder, 81% by weight of the active material, 10% by weight of the carbon black and 1% by weight of the thickener.

Comparative Example 1—Aqueous VDF Homopolymer Latex (A) Manufacture of Aqueous VDF Homopolymer Latex In a 21 lt. horizontal reactor autoclave equipped with baffles and stirrer working at 40 rpm, 14 lt. of deionised water were introduced, followed by 0.1 g of a 20% by weight aqueous solution of FLUOROLINK® 7800 SW sodium salt fluorinated surfactant.

The pressure of 35 bar was maintained constant throughout the whole trial by feeding VDF gaseous monomer. Then the temperature was brought to 85° C. and 400 ml of a 37.5 g/l aqueous solution of ammonium persulfate (APS) were added over a period of 20 minutes.

When 5000 g of the mixture were fed, the feeding mixture was interrupted, then the pressure was let to fall down up to 11 bar while keeping the reaction temperature constant. Final reaction time was 120 min.

The reactor was cooled to room temperature, the latex was unloaded and 1000 g of a 10% by weight aqueous solution of PLURONIC® F108 hydrogenated surfactant were added upon stirring.

The aqueous latex so obtained had a solid content of 27.5% by weight.

(B) Manufacture of a Negative Electrode

The same procedure as detailed under Example 1-(B) was followed but an aqueous composition was prepared by mixing 3.27 g of VDF homopolymer latex and 0.3 g of carboxylated methyl cellulose as thickener, 12.5 g of deionised water and 28.8 g of synthetic graphitized mesocarbon microbeads commercially available as MCMB 6-28 by OSAKA GAS CHEMICAL Co., Ltd.

The thickness of the dried coating layer was about 50-60 μm.

The negative electrode so obtained was composed by 3% by weight of the VDF homopolymer binder, 96% by weight of the active material and 1% by weight of the thickener.

EXAMPLE 2—AQUEOUS VDF-AA POLYMER LATEX (A) Manufacture of Aqueous VDF-AA Polymer Latex In a 21 lt. horizontal reactor autoclave equipped with baffles and stirrer working at 60 rpm, 15 lt. of deionised water were introduced, followed by 75 g of a microemulsion obtained as described in Example 1 of U.S. Pat. No. 7,122,608 (SOLVAY SOLEXIS S.P.A.) 17, Oct. 2006. The pressure of 50 bar was maintained constant throughout the whole trial by feeding VDF gaseous monomer. Then the temperature was brought to 125° C. and 22.5 g of di-tert-butyl peroxide (DTBP) were added. When 5% of the VDF monomer was fed, the temperature was lowered to 120° C. For the whole duration of the trial, 15 ml of a solution of acrylic acid (1.3% w/w acrylic acid in water) were fed every 278 g of polymer synthesized.

When 5550 g of the mixture were fed, the feeding mixture was interrupted, then the pressure was let to fall down up to 15 bar while keeping the reaction temperature constant. The reactor was cooled to room temperature and the latex was unloaded.

The VDF-AA polymer so obtained contained 0.05% by moles of acrylic acid (AA) monomer.

The aqueous latex so obtained had a solid content of 25.7% by weight.

The VDF-AA polymer is dispersed in the aqueous latex under the form of particles having an average primary size of 262 nm, as measured according to ISO 13321.

(B) Manufacture of a Negative Electrode

The same procedure as detailed under Example 1-(B) was followed but the negative electrode obtained was composed by 10% by weight of the VDF-AA polymer binder, 1% by weight of the active material and 89% by weight of the thickener.

Comparative Example 2—Aqueous VDF Homopolymer Latex (A) Manufacture of Aqueous VDF Homopolymer Latex In a 21 lt. horizontal reactor autoclave equipped with baffles and stirrer working at 60 rpm, 12 lt. of deionised water were introduced, followed by 45 g of a 20% by weight aqueous solution of FLUOROLINK® 7800 SW sodium salt fluorinated surfactant.

The pressure of 45 bar was maintained constant throughout the whole trial by feeding VDF gaseous monomer. Then the temperature was brought to 122.5° C. and 38 g of di-tert-butyl peroxide (DTBP) were added.

When 4050 g of the mixture were fed, the feeding mixture was interrupted, then the pressure was let to fall down up to 15 bar while keeping the reaction temperature constant.

The reactor was cooled to room temperature, the latex was unloaded and 2000 g of a 10% by weight aqueous solution of PLURONIC® F108 hydrogenated surfactant were added upon stirring.

The aqueous latex so obtained had a solid content of 23% by weight.

(B) Manufacture of a Negative Electrode

The same procedure as detailed under Example 1-(B) was followed but the negative electrode obtained was composed by 10% by weight of the VDF homopolymer binder, 89% by weight of the active material and 1% by weight of the thickener.

Comparative Example 3—Aqueous VDF-AA Polymer Slurry

The same procedure as detailed under Example 1-(B) was followed but an aqueous composition was prepared but using VDF-AA polymer prepared as described in Example 1 of WO 2008/129041 (SOLVAY SOLEXIS S.P.A.) 30, Oct. 2008. The VDF-AA polymer is dispersed therein under the form of particles having an average size of 120 μm.

No adhesion was obtained by casting the aqueous composition so obtained on a copper foil as detailed under Example 1-(B).

Manufacture of Batteries

Lithium coin cells (CR2032) were prepared in a glove box under Ar gas atmosphere by punching a small disk of the electrode prepared according to Examples 1 and 2 and Comparative Examples 1 and 2 with Lithium metal as counter and reference electrode. The electrolyte was 1 M LiPF$_6$ in EC/DMC (1:1) and a Whatman® glass-fiber paper was used as separator.

After initial charge and discharge cycles at low current rate, cells were galvanostatically cycled at different current rates, between 0.1 C and 10 C. Cells prepared using the negative electrodes prepared according to Examples 1-(B) and 2-(B) and Comparative Examples 1-(B) and 2-(B) were also cycled at a constant current rate of 0.1 C to show capacity fade over cycling (see Table 1 here below).

TABLE 1

| | Viscosity (cPs) | Initial reversible Capacity (mAh/g) | Reversible Capacity at 1 C (mAh/g) | Capacity retention after 20 cycles at 0.1 C |
|---|---|---|---|---|
| Example 1-(B) | 8600 | 258 | 64 | 97% |
| C. Example 1-(B) | 7300 | 249 | 58 | 85% |
| Example 2-(B) | 4900 | 286 | 83 | 99% |
| C. Example 2-(B) | 1700 | 255 | 49 | 99% |

It has been thus found that by the aqueous composition of the present invention it is advantageously possible to manufacture electrodes according to Example 1 having enhanced reversible capacity values at 1 C and enhanced capacity retention values after 20 cycles at 0.1 C as compared with electrodes obtained according to comparative Example 1.

Also, it has been thus found that by the aqueous composition of the present invention it is advantageously possible to manufacture electrodes according to Example 2 having enhanced reversible capacity values at 1 C as compared with electrodes obtained according to comparative Example 2.

Cells prepared using the positive electrodes prepared according to Example 1 were also cycled at a constant current rate of 0.3 C (Example 1(C)) and at a constant current rate of 1 C (Example 1-(D)) to show capacity fade over cycling (see Table 2 here below).

TABLE 2

| | Initial reversible Capacity (mAh/g) | Reversible Capacity at 1 C (mAh/g) | Capacity retention after 20 cycles |
|---|---|---|---|
| Example 1-(C) | 152 | 103 | 90% |
| Example 1-(D) | 164 | 142 | 99% |

The invention claimed is:

1. An aqueous composition comprising:
    (A) an aqueous latex comprising at least one polymer (F), wherein the polymer (F) comprises recurring units derived from vinylidene fluoride (VDF) and between 0.01% and 10% by moles of recurring units derived from at least one (meth)acrylic monomer (MA) of formula (I):

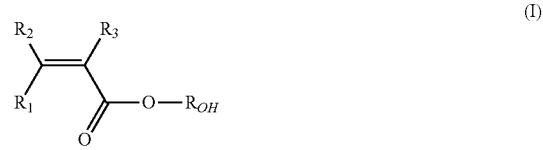

wherein:
    $R_1$, $R_2$ and $R_3$, equal to or different from each other, are independently selected from a hydrogen atom and a $C_1$-$C_3$ hydrocarbon group, and
    $R_{OH}$ is a hydrogen atom or a $C_1$-$C_5$ hydrocarbon moiety comprising at least one hydroxyl group,
    (B) at least one powdery electrode material, and
    (C) optionally, less than 10% by weight, based on the total weight of the aqueous composition, of at least one organic solvent (S),
wherein the polymer (F) in the aqueous latex is in the form of primary particles having an average primary particle size of less than 1 μm, as measured according to ISO 13321.

2. The aqueous composition according to claim 1, wherein the aqueous latex is prepared by aqueous emulsion polymerization in an aqueous medium of the at least one vinylidene fluoride (VDF) and the at least one (meth)acrylic monomer (MA) having formula (I), optionally in the presence of at least one other comonomer (C).

3. The aqueous composition according to claim 1, wherein the aqueous latex has the primary particles homogenously dispersed therein.

4. The aqueous composition according to claim 1, wherein the at least one (meth)acrylic monomer (MA) of formula (I) is at least one (meth)acrylic monomer (MA) of formula (II):

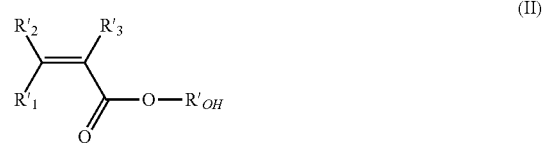

wherein:
R'₁, R'₂ and R'₃ are hydrogen atoms, and
R'$_{OH}$ is a hydrogen atom or a C₁-C₅ hydrocarbon moiety comprising at least one hydroxyl group.

5. The aqueous composition according to claim 1, wherein the (meth)acrylic monomer (MA) of formula (I) is acrylic acid (AA).

6. The aqueous composition according to claim 1, consisting of:
(A) the aqueous latex, wherein said aqueous latex consists of:
from 10% to 50% by weight, based on the total weight of the aqueous latex, of the at least one polymer (F), and
optionally, at least one surfactant selected from a fluorinated surfactant (FS), a hydrogenated surfactant (H) and mixtures thereof, and
(B) from 20% to 80% by weight, based on the total weight of the aqueous composition, of the at least one powdery electrode material,
wherein the average primary particle size of the primary particles of the polymer (F) is between 50 nm and 600 nm, as measured according to ISO 13321.

7. The aqueous composition according to claim 1, wherein the aqueous latex is prepared by an aqueous emulsion polymerization process without any subsequent coagulation step.

8. The aqueous composition according to claim 1, consisting of:
(A) the aqueous latex, wherein said aqueous latex consists of:
from 20% to 35% by weight, based on the total weight of the aqueous latex, of the at least one polymer (F), and
optionally, at least one surfactant selected from a fluorinated surfactant (FS), a hydrogenated surfactant (H) and mixtures thereof, and
(B) from 40% to 70% by weight, based on the total weight of the aqueous composition, of the at least one powdery electrode material,
wherein the average primary particle size of the primary particles of the polymer (F) is between 80 nm and 400 nm, as measured according to ISO 13321.

9. The aqueous composition according to claim 8, wherein the at least one (meth)acrylic monomer (MA) of formula (I) is at least one (meth)acrylic monomer (MA) of formula (II):

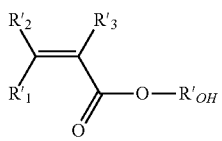

(II)

wherein:
R'₁, R'₂ and R'₃ are hydrogen atoms, and
R'$_{OH}$ is a hydrogen atom or a C₁-C₅ hydrocarbon moiety comprising at least one hydroxyl group.

10. The aqueous composition according to claim 8, wherein the (meth)acrylic monomer (MA) of formula (I) is acrylic acid (AA).

11. An electrode comprising a metal substrate coated on at least one surface with the aqueous composition according to claim 1.

12. The electrode according to claim 11, comprising:
from 1% to 15% by weight, based on the total weight of the electrode, of the at least one polymer (F),
from 80% to 99% by weight, based on the total weight of the electrode, of the at least one powdery electrode material, and
optionally, up to 10% by weight, based on the total weight of the electrode, of one or more additives.

13. The electrode according to claim 11, comprising:
from 2% to 12% by weight, based on the total weight of the electrode, of the at least one polymer (F),
from 85% to 98% by weight, based on the total weight of the electrode, of the at least one powdery electrode material, and
optionally, up to 5% by weight, based on the total weight of the electrode, of one or more additives.

14. The electrode according to claim 13, wherein the at least one (meth)acrylic monomer (MA) of formula (I) is at least one (meth)acrylic monomer (MA) of formula (II):

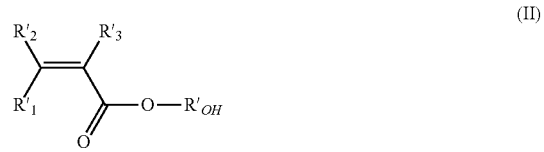

(II)

wherein:
R'₁, R'₂ and R'₃ are hydrogen atoms, and
R'$_{OH}$ is a hydrogen atom or a C₁-C₅ hydrocarbon moiety comprising at least one hydroxyl group.

15. A non-aqueous-type electrochemical device comprising the electrode according to claim 11.

16. A lithium ion secondary battery comprising the electrode according to claim 11.

17. A process for manufacturing an electrode, said process comprising:
(i) providing an aqueous latex comprising at least one vinylidene fluoride (VDF) polymer (F), said polymer (F) comprising recurring units derived from vinylidene fluoride (VDF) and at least one (meth)acrylic monomer (MA) of formula (I):

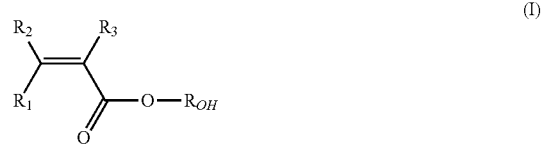

(I)

wherein:
R₁, R₂ and R₃, equal to or different from each other, are independently selected from a hydrogen atom and a C₁-C₃ hydrocarbon group, and
R$_{OH}$ is a hydrogen atom or a C₁-C₅ hydrocarbon moiety comprising at least one hydroxyl group;
(ii) admixing said aqueous latex with at least one powdery electrode material, optionally in the presence of one or more additives, to provide an aqueous electrode-forming composition;
(iii) applying said aqueous electrode-forming composition onto at least one surface of a metal substrate to provide at least one electroactive layer adhered to the at least one surface of said metal substrate; and (iv) drying said electroactive layer to provide said electrode.

18. The process according to claim 17, wherein the aqueous electrode-forming composition is for manufacturing negative electrodes or anodes, and said composition comprises:
   (a') from 0.5% to 10% by weight, based on the total weight of (a')+(b')+(c'), of the at least one polymer (F),
   (b') from 20% to 80% by weight, based on the total weight of (a')+(b')+(c'), of the at least one powdery electrode material, and
   (c') optionally, up to 2% by weight, based on the total weight of (a')+(b')+(c'), of a thickener.

* * * * *